(12) United States Patent
Iwamoto

(10) Patent No.: US 6,404,593 B1
(45) Date of Patent: Jun. 11, 2002

(54) TWO-PIECE LOAD BEAM MOUNT SYSTEM

(75) Inventor: Alejandro Koji Iwamoto, Temecula, CA (US)

(73) Assignee: Magnecomp Corp., Temecula, CA (US)

(*) Notice: Subject to any disclaimer, the term of this patent is extended or adjusted under 35 U.S.C. 154(b) by 88 days.

(21) Appl. No.: 09/592,141

(22) Filed: Jun. 12, 2000

Related U.S. Application Data

(60) Provisional application No. 60/194,961, filed on Apr. 5, 2000.

(51) Int. Cl.[7] .................................................. G11B 5/54
(52) U.S. Cl. ..................................... 360/244.6; 360/104
(58) Field of Search ........................... 360/244.6, 244.3, 360/244.7, 244.5; 29/507, 523, 522.1, 603.04

(56) References Cited

U.S. PATENT DOCUMENTS

| | | | | |
|---|---|---|---|---|
| 5,689,389 A | * | 11/1997 | Braunheim | 360/104 |
| 5,757,586 A | * | 5/1998 | Budde | 360/104 |
| 5,956,210 A | * | 9/1999 | Kaneko | 360/104 |
| 6,031,688 A | * | 2/2000 | Summers | 360/104 |
| 6,046,885 A | * | 4/2000 | Aimonetti et al. | 360/104 |
| 6,069,772 A | * | 5/2000 | Braunheim et al. | 360/104 |
| 6,175,474 B1 | * | 1/2001 | Boutaghou et al. | 360/244.6 |
| 6,183,841 B1 | * | 2/2001 | Hanrahan et al. | 360/104 |

* cited by examiner

*Primary Examiner*—Allen Cao
*Assistant Examiner*—Dzung C. Nguyen
(74) *Attorney, Agent, or Firm*—Louis J. Bachand

(57) ABSTRACT

A two-piece load beam mounting system supports a load beam in operating proximity to a disk, the mounting system comprising a small mount less subject to flatness problems, the mount having a plate and a central boss, the mount plate having lateral and longitudinal dimensions less than the base portion corresponding dimensions, and a support having lateral and longitudinal dimensions to register with the base portion when the support is sandwiched between the mount and the load beam base portion in attached relation to each; the support and mount plate cooperating to have their combined height no greater than the height of the support to achieve a greater stiffness in the mount system without increasing the height.

20 Claims, 2 Drawing Sheets

TWO-PIECE LOAD BEAM MOUNT SYSTEM

CROSS-REFERENCE TO RELATED APPLICATION

This application claims the benefit of U.S. Application Ser. No. 60/194,961 filed Apr. 5, 2000.

STATEMENT REGARDING FEDERALLY SPONSORED RESEARCH OR DEVELOPMENT

NOT APPLICABLE

REFERENCE TO MICROFICHE APPENDIX

Not Applicable

BACKGROUND OF THE INVENTION

1. Field of the Invention

This invention relates to disk drive suspensions, and more particularly to a two-piece mount system for attaching a load beam to the arm of an actuator. The invention mount plate is reduced in area, mass and by up to one-half in plate height, but is supported by a separately formed additional support member that connects the smaller area mount to the greater area load beam base. The added support member thickness absorbs the mount plate thickness and thus does not increase overall the height of the mount system, but does provide the needed rigidity in the system.

2. Related Art

Mount plates for attaching load beams to actuator arms are known, but old designs do not provide a sufficiently lowered profile for today's compact disk drives, and have excessive mass. Thin mounts lose rigidity and are difficult to handle in manufacturing operations. A reduction in mount height enables closer spacing of the head gimbal assemblies, but such height reduction cannot come at the price of loss of stiffness needed for handling the mount or inadequate rigidity in use.

SUMMARY OF THE INVENTION

It is an object of the invention to provide an improved mount for load beam attachment to an actuator arm. It is a further object to provide a reduced height and reduced area mount that will have fewer flatness problems. It is a further object to provide a two-piece mount system in which the smaller mount plate is combined for functional and height purposes with a contoured support member offsetting any thinness-engendered problems in the mount plate or the load beam base portion.

These and other objects of the invention, to become apparent hereinafter are realized in a two-piece load beam mounting system for supporting a load beam in operating proximity to a disk, the load beam having a base portion of predetermined lateral and longitudinal dimensions, the mounting system comprising a mount having a plate and a central boss, the mount plate having lateral and longitudinal dimensions less than the base portion corresponding dimensions, and a support having lateral and longitudinal dimensions to register with the base portion, the support being sandwiched between the mount and the load beam base portion in attached relation to each, the support and mount plate cooperating to have their combined height no greater than the height of the support.

In this and like embodiments, typically, the support is weld-attached to the base portion and mount plate.

In a first embodiment, the load beam base portion has single thickness left and right longitudinally extended shoulders, the support having a single thickness except for a recess sized to bodily receive the mount plate on one face of the support and a longitudinally extended relief opposite each base portion shoulder, each relief receiving the opposed shoulder in mounting system height reducing relation. In this embodiment, preferably, the mount plate has a thickness of about 0.004 inch, the support between the mount plate and the load beam base portion has a thickness of about 0.002 inch and opposite the shoulders a thickness of about 0.001 inch, the base portion having a thickness of about 0.002 inch at its the shoulders.

In a second embodiment of the invention the mount plate has a single thickness, the support has a single thickness, except for a recess sized to bodily receive the mount plate, and the load beam base portion has a single thickness. Preferably, the mount plate has a thickness of about 0.004 inch, the support between the mount plate and the load beam base portion has a thickness of about 0.002 inch and the base portion has a thickness of about 0.002 inch.

In a third embodiment, the load beam base portion has a single thickness except for a :central longitudinal channel between left and right longitudinally extended shoulders, the shoulders being joined by a web forming the bottom of the channel, the support having a single thickness except for a recess sized to bodily receive the mount plate on one face of the support and a longitudinally extended relief opposite each base portion shoulder, each relief receiving the opposed shoulder in mounting system height reducing relation. In this embodiment,: preferably, the mounting plate has a thickness of about 0.004 inch, the support between the mounting plate and the load beam base portion has a thickness of about 0.002 inch and opposite the shoulders a thickness of about 0.001 inch, the base portion having a thickness of about 0.002 inch at its the shoulders and the web a thickness of about 0.001 inch between the shoulder and opposite the mount plate.

The several two-piece mount embodiments are provided in combination with a load beam having the base portion.

The invention further provides a disk drive suspension comprising a load beam having a base portion of predetermined dimensions including a certain height, a two-piece mount comprising a first member and a second member, the first member comprising a boss that is swageable to an actuator arm opening, and a plate supporting the boss, the plate being planar and of predetermined dimensions including lateral and longitudinal extents providing first and second plate faces and a thickness between the faces such that the plate has insufficient stiffness for the first member to be the sole mount for the load beam; the mount second member comprising a support of predetermined lateral and longitudinal extents greater than the corresponding lateral and longitudinal extents of said plate and providing first and second support faces on the support, the support face abutting the plate first or second face, the support having a certain thickness such that the plate and the support plate taken together have sufficient thickness to define a the mount for the load beam.

BRIEF DESCRIPTION OF THE DRAWINGS

The invention will be further described in conjunction with the attached drawings in which.

DETAILED DESCRIPTION OF THE INVENTION

Typical mounts used at this time are squares that provide an area of 0.200 square inch. The mount thickness is generally 0.008 inch. In the invention, the area of the mount is reduced to ⅓ or ⅔ the standard area. The thickness is reduced to about ½ the standard thickness.

This invention enables a reduction in head stack height by the thinning of the mount plate and enables added rigidity in the system by using a support for the reduced size plate. The system components are advantageously formed in their desired. thickness by stamping or etching operations that afford a good degree of control and precision, and flexibility of design. The smaller mount plate is less subject to flatness problems stemming from swaging into the actuator arm than the conventional larger mount plate. In the invention there is no forming of a cavity in the mount plate so the mount plate has a constant thickness.

Figure 1:
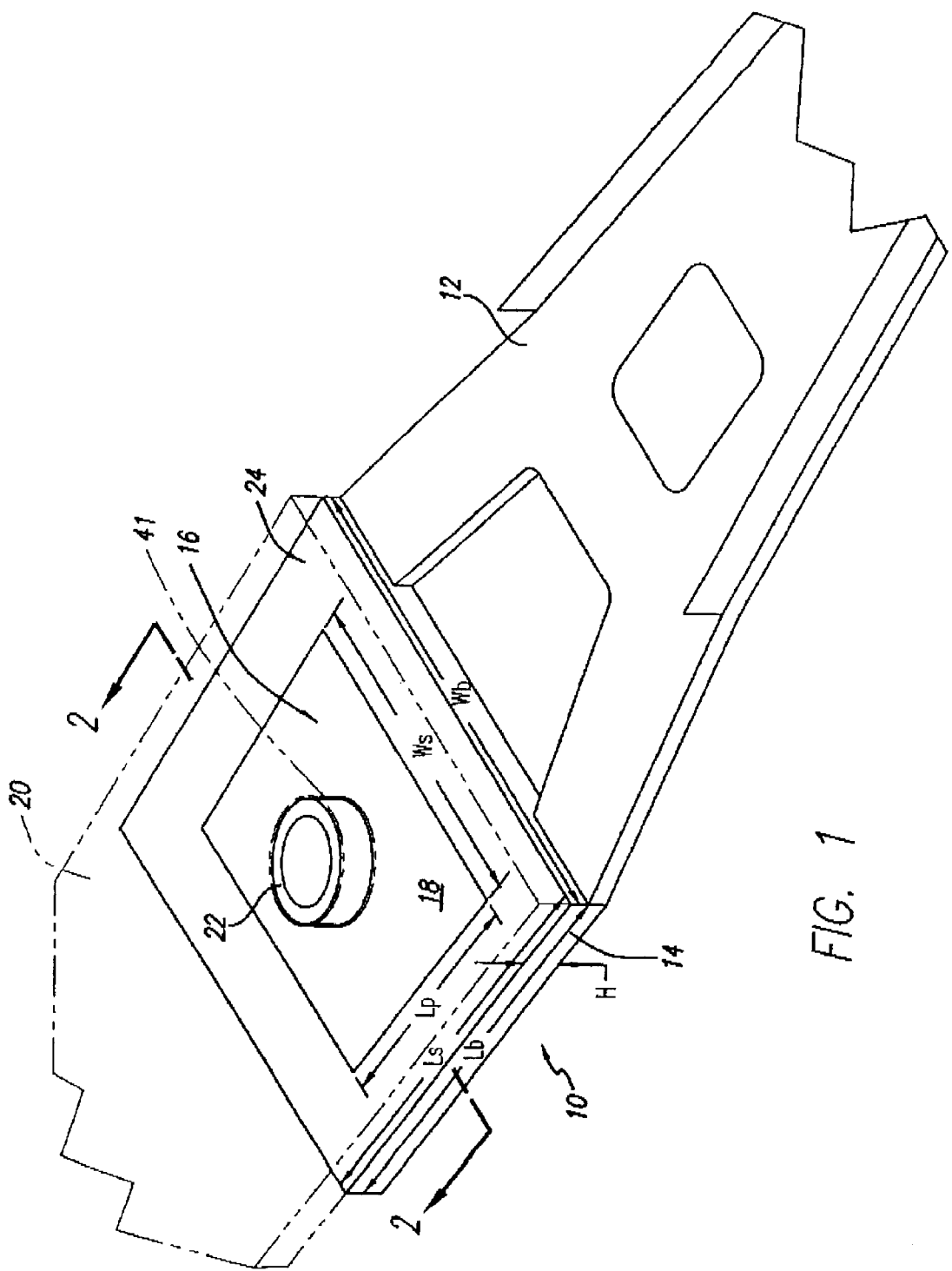
FIG. 1 is an oblique view of a disk drive suspension according to the invention employing the second embodiment of the two-piece mount system.
Figure 2:
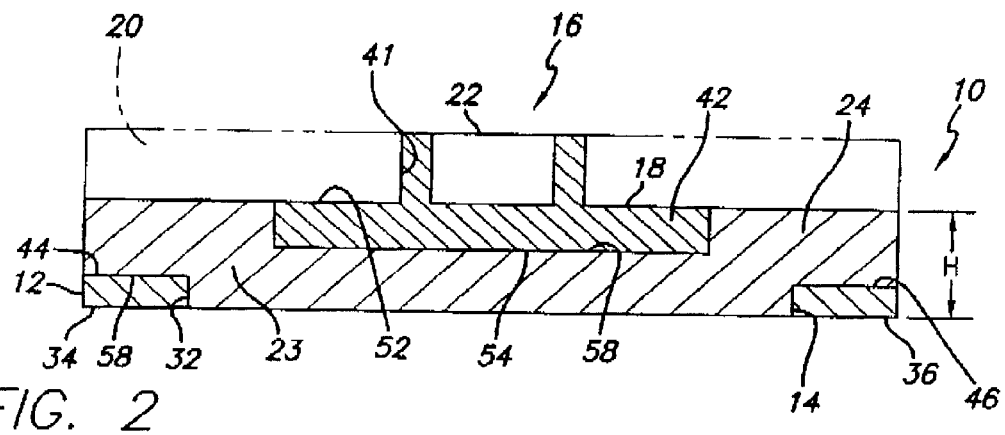
FIG. 2 is a view taken on line 2—2 in FIG. 1.

With reference now to the drawings, FIGS. 1 and 2 show at 10 the invention two-piece load beam mount system in the first embodiment for mounting at a disk (not shown) a load beam 12 having a base portion 14 of predetermined lateral and longitudinal dimensions Wb and Lb respectively. The mount system 10 comprises the mount 16 per se that comprises plate 18 and a central boss 22 for attaching the load beam 12 to actuator arm 20. The mount plate 18 has lateral and longitudinal dimensions Wp and Lp respectively that are less than the base portion corresponding dimensions (Wb, Lb). A support 24 is provided having lateral and longitudinal dimensions Ws and Ls respectively, sized to register with the base portion 14, that is the dimensions Ws, Ls are within about +/−15% of the dimensions Wp, Lp.

The support 24 is sandwiched between the mount 16 and the load beam base portion 14 in attached, suitably weld- or glue-attached, relation to each. The support 24 and mount plate 18 cooperate, as shown, to have their combined height no greater than the height of the support.

In the first embodiment, the load beam base portion 14 has single thickness base portion left and right longitudinally extended shoulders 34, 36. The support 24 also has a single thickness, as shown, except for the recess 38 sized to bodily receive the mount plate 18 on one face 42 of the support and a longitudinally extended relief 44, 46 opposite each base portion shoulder 34, 36, each relief receiving the opposed shoulder in mounting system height reducing relation. In this second embodiment, preferably, the mount plate 18 has a thickness of about 0.004 inch, the support portion 23 between the mount plate and the load beam base portion 14 has a thickness of about 0.002 inch and opposite the shoulders 34, 36 a thickness of about 0.001 inch; the base portion 14 having a thickness of about 0.002 inch at its shoulders.

With further reference to FIGS. 1 and 2, load beam 12 base portion 14 is of predetermined dimensions Wb, Lb including a certain height H. The two-piece mount 10 comprises a first member having boss 22 that is swageable to the actuator arm 20 at opening 4. Plate 18 supports the boss 22. The plate 18 is planar and of predetermined dimensions including certain lateral and longitudinal extents Wp, Lp, providing first and second plate faces 52, 54 on the base 14 and a thickness between the faces such that the plate has insufficient stiffness for the first member to be the sole mount for the load beam 12. The mount second member comprises support 24 of predetermined lateral and longitudinal extents Ws, Ls, providing first and second support faces 42, 58 on the support. The support face 58 abuts the plate face 52. The support 24 is selected to have a certain thickness such that the plate 18 and the support 24 taken together have sufficient thickness to define a mount suitable for the load beam 12.

Figure 3:
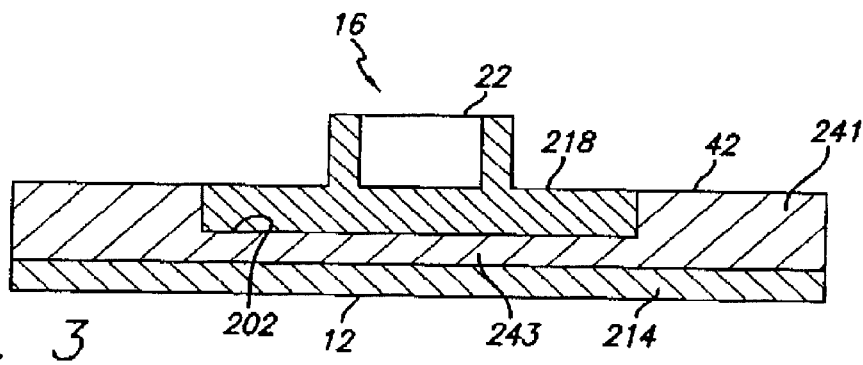
FIG. 3 is a view like FIG. 2 of the first embodiment of the invention.

In a second embodiment of the invention, shown in FIG. 3, the mount plate 218 has a single plate thickness, as shown.,The support 241 also has a single thickness, except for recess 202 sized to bodily receive the mount plate 218. The load beam base portion 214 also has a single thickness. Preferably, in this embodiment, the mount plate 218 has a thickness of about 0.004 inch, the support portion 243 between the mount plate and the load beam base portion 141 has a thickness of about 0.002 inch and the base portion 214 has a thickness of about 0.002 inch.

Figure 4:
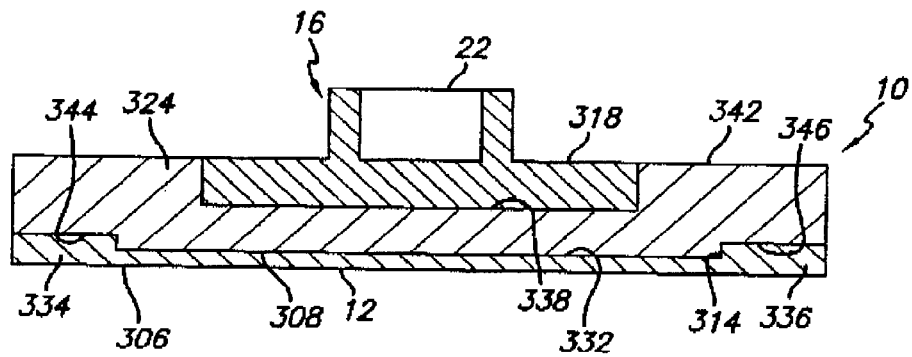
FIG. 4 is a view like FIG. 2 of a third embodiment of the invention.

In a third embodiment, shown in FIG. 4, the load beam base portion 314 has a single thickness, as shown, except for a central longitudinal channel 332 between left and right longitudinally extended shoulders 334, 336. A web 306 forming the bottom 308 of the channel 332 joins the shoulders 334, 336. The support 324 has a single thickness, as shown, except for a recess 338 sized to bodily receive the mount plate 318 on one face 342 of the support and a longitudinally extended relief 344, 346 opposite each base portion shoulder so that each relief receives the opposed shoulder in mounting system height reducing relation. In this third embodiment, preferably, the mounting plate has a thickness of about 0.004 inch, the support between the mounting plate 324 and the load beam base portion 314 has a thickness of about 0.002 inch and opposite the shoulders a thickness of about 0.001 inch. The base portion 314 has a thickness of about 0.002 inch at its the shoulders 334, 336 and the web 306 a thickness of about 0.001 inch between the shoulders and opposite the mount plate. 318.

The invention thus provides an improved mount for load beam attachment to an actuator arm having a reduced height and reduced area mount that suffers fewer flatness problems in swaging to an arm by using a support to receive the mount and connect it to the load beam base portion.

I claim:

1. A two-piece load beam mounting system for supporting a load beam in operating proximity to a disk, said load beam having a base portion of predetermined lateral and longitudinal dimensions, said mounting system comprising a mount having a plate and a central boss, said mount plate having lateral and longitudinal dimensions less than said base portion corresponding dimensions, and a support having lateral and longitudinal dimensions to register with said base portion, said support being sandwiched between said mount and said load beam base portion in attached relation to each, said support and mount plate cooperating to have their combined height no greater than the height of said support.

2. The two-piece load beam mounting system according to claim 1, in which said support is weld-attached to said base portion and mount plate.

3. The two-piece load beam mounting system according to claim 1, in which said mount plate has a single thickness.

4. The two-piece load beam mounting system according to claim 1, in which said load beam base portion comprises single thickness left and right longitudinally extended shoulders, said support having a single thickness except for a recess sized to bodily receive said mount plate on one face of said support and a longitudinally extended relief opposite each said base portion shoulder, each said relief receiving said opposed shoulder in mounting system height reducing relation.

5. The two-piece load beam mounting system according to claim 4, in which said mounting plate has a thickness of about 0.004 inch, said support between said mounting plate and said load beam base portion has a thickness of about 0.002 inch and opposite said shoulders a thickness of about 0.001 inch, said base portion having a thickness of about 0.002 inch at its said shoulders.

6. The two-piece load beam mounting system according to claim 1, in which said support has a single thickness, except for a recess sized to bodily receive said mount plate.

7. The two-piece load beam mounting system according to claim 6, in which said load beam base portion has a single thickness.

8. The two-piece load beam mounting system according to claim 7, in which said mounting plate has a thickness of about 0.004 inch, said support between said mounting plate and said load beam base portion has a thickness of about 0.002 inch and said base portion has a thickness of about 0.002 inch.

9. The two-piece load beam mounting system according to claim 1, in which said load beam base portion has a single thickness except for a central longitudinal channel between left and right longitudinally extended shoulders, said shoulder s being joined by a web forming the bottom of said channel, said support having a single thickness except for a recess sized to bodily receive said mount plate on one face of said support and a longitudinally extended relief opposite each said base portion shoulder, each said relief receiving said opposed shoulder in mount system height reducing relation.

10. The two-piece load beam mounting system according to claim 9, in which said mount plate has a thickness of about 0.004 inch, said support between said mount plate and said load beam base portion has a thickness of about 0.002 inch and opposite said shoulders a thickness of about 0.001 inch, said base portion having a thickness of about 0.002 inch at its said shoulders and a web thickness of about 0.001 inch between said shoulder and opposite said mount plate.

11. In combination: the two-piece mount of claim 1 and a load beam having said base portion.

12. A disk drive suspension comprising a load beam having a base portion of predetermined dimensions including a certain height, and a two-piece mount comprising a first member and a second member, said first member comprising a boss that is swageable to an actuator arm opening, and a plate supporting said boss, said plate being planar and of predetermined dimensions including lateral and longitudinal extents providing first and second plate faces on said base and a thickness between said faces such that said plate has insufficient stiffness for said first member to be the sole mount for said load beam; said mount second member comprising a support of predetermined lateral and longitudinal extents greater than said plate corresponding extents and providing first and second support faces on said support, a said support face abutting a said plate face, said support having a certain thickness such that said plate and said support plate taken together have sufficient thickness to define a mount for said load beam.

13. The disk drive suspension according to claim 12, in which said support is weld-attached to said base portion and mount plate.

14. The disk drive suspension according to claim 13, in which said load beam base portion comprises single thickness left and right longitudinally extended shoulders, said support having a single thickness except for a recess sized to bodily receive said plate on one face of said support and a longitudinally extended relief opposite each said base portion shoulder, each said relief receiving said opposed shoulder in mounting system height reducing relation.

15. The disk drive suspension according to claim 14, in which said plate has a thickness of about 0.004 inch, said support between said plate and said load beam base portion has a thickness of about 0.002 inch and opposite said shoulders a thickness of about 0.001 inch, said base portion having a thickness of about 0.002 inch at its said shoulders.

16. The disk drive suspension according to claim 13, in which said support has a single thickness, except for a recess sized to bodily receive said plate.

17. The disk drive suspension according to claim 16, in which said load beam base portion has a single thickness.

18. The disk drive suspension according to claim 17, in which said plate has a thickness of about 0.004 inch, said support between said mounting plate and said load beam base portion has a thickness of about 0.002 inch and said base portion has a thickness of about 0.002 inch.

19. The disk drive suspension according to claim 13, in which said load beam base portion has a single thickness except for a central longitudinal channel between left and right longitudinally extended shoulders, said shoulders being joined by a web forming the bottom of said channel, said support having a single thickness except for a recess sized to bodily receive said mount plate on one face of said support and a longitudinally extended relief opposite each said base portion shoulder, each said relief receiving said opposed shoulder in mount system height reducing relation.

20. The disk drive suspension according to claim 19, in which said mount plate has a thickness of about 0.004 inch, said support between said plate and said load beam base portion has a thickness of about 0.002 inch and opposite said shoulders a thickness of about 0.001 inch, said base portion having a thickness of about 0.002 inch at its said shoulders and a web thickness of about 0.001 inch between said shoulder and opposite said mount plate.

* * * * *